United States Patent [19]

Crandall

[11] Patent Number: 4,544,061

[45] Date of Patent: Oct. 1, 1985

[54] BELT PRESS

[75] Inventor: Robert E. Crandall, Greendale, Wis.

[73] Assignee: Rexnord Inc., Brookfield, Wis.

[21] Appl. No.: 540,461

[22] Filed: Oct. 11, 1983

[51] Int. Cl.[4] .............................................. B65G 23/44

[52] U.S. Cl. .................................... 198/813; 474/110; 91/171; 100/118; 210/386; 254/89 H; 254/47

[58] Field of Search ................ 198/813, 814; 474/110; 91/1, 171; 100/118–120; 210/386, 400, 401, 541, 783; 254/89 H, 47

[56] References Cited

U.S. PATENT DOCUMENTS

| | | | |
|---|---|---|---|
| 2,601,759 | 7/1952 | Harrison et al. | 91/171 |
| 2,975,560 | 3/1961 | Leonard | 254/89 H |
| 3,106,152 | 10/1963 | Coffelt | 100/118 |
| 3,459,122 | 8/1969 | Pastoors et al. | 210/386 |
| 3,765,648 | 10/1973 | Rasmussen et al. | 254/47 |
| 3,796,149 | 3/1974 | Heissenberger | 100/118 |
| 3,921,793 | 11/1975 | Hutchinson | 198/813 |
| 4,147,101 | 4/1979 | Heissenberger et al. | 210/386 |
| 4,159,947 | 7/1979 | Brooks et al. | 210/386 |
| 4,324,659 | 4/1982 | Titoff | 210/386 |

*Primary Examiner*—Joseph E. Valenza

*Attorney, Agent, or Firm*—John M. Neary; John M. Lorenzen; Lawrence J. Crain

[57] ABSTRACT

A conveyor belt tensioning system having two fluid piston and cylinders units on each lateral side of the belt. The units are parallel to each other and are attached to a tensioning roll. A pair of cables are attached to both of the pistons and pass around pulleys in a manner as to compensate for any differences in force between the pistons such that the pistons move in the same direction the same amount.

7 Claims, 22 Drawing Figures

BELT PRESS

BACKGROUND OF THE INVENTION

This invention relates to a belt press for increasing the solids concentration of a slurry by reducing the liquid component.

Belt presses have been known for many years and have been used in many applications, such as the dewatering of sewage sludge, peat, industrial wastes, cement slurries, and coal slurries. The belt press of the present invention was designed to handle large volumes of slurry containing a wide variety of solids, including coarse, abrasive, relatively incompressible materials as well as fines, such as occur in coal tailings slurry, but could be used in other applications as well.

One application in which a belt press is particularly suitable is for dewatering of coal tailings. Coal tailings are the materials that are washed from coal after it has been crushed. The wash water from the coal washing operation is pumped into a thickener, such as a large cylindrical tank, where the solids settle to the bottom and the clear water flows out of a top launder for reuse in the coal washer. The settled material is collected at the bottom and is pumped out of the thickener. This material, known as the thickener underflow, typically contains about 60–80% water and about 20–40% solids. The solids include minerals such as rock, chemically undesirable materials such as pyrites, and fines such as clay, silt and coal fines. In the past, the underflow has been pumped into settlement ponds with the purpose of allowing the water to percolate down into the ground. In practice, this has not been a satisfactory method of disposal because the fines in the tailings sink to the bottom and form an impervious blanket that retains the water in the pond. Since the ponds remain fluid for years, the land usage of this procedure is excessive. If the tailing slurry could be dewatered prior to disposal, it could be handled and used like dirt for strip mine backfill and other useful purposes. Effective dewatering of the tailing slurry would convert this material from a problem to an asset.

Belt presses in the past have encountered many problems, and the present invention is intended to remedy many of those problems. For example, other presses have encountered problems in their belt tensioning systems. The belt tensioning systems are typically controlled by two air or hydraulic cylinders, air bags, diaphragms, or other fluid actuators which are attached to pistons, which in turn support a belt tensioning roll. The pistons in those fluid actuators must move together, otherwise the belt tensioning roll becomes skewed relative to the belt which causes unnecessary wear on the belt and causes the belt to track incorrectly. Therefore, many manufacturers have provided various schemes to ensure that the two pistons move together. For example, U.S. Pat. No. 1,347,121 "Rice" describes a rack and pinion structure mounted on the belt press frame for preventing skewing of the belt tensioning roll. However a rack and pinion system is quite expensive and difficult to adjust, and the rack and pinion may become jammed if the slurry overflows the belt and gets into the rack teeth. The present invention provides, a simple, inexpensive, easily adjustable cable arrangement for keeping the belt tensioning roll aligned.

Another problem encountered in belt tensioning systems of the prior art is that belts may become greatly elongated by stretching before wearing out, but the fluid actuators of the known belt tensioning systems are not able to extend as far as the belt stretches. Consequently, the belts must be replaced before they are actually worn out, which is quite an expensive and time consuming undertaking. The present invention solves this problem by providing an extension adjustment on the primary belt tensioner, and by providing a secondary belt take-up adjustment.

Belt tracking systems which are intended to keep the belt running in a straight line are known in the art. The belt tracking systems typically include a sensor for determining when the belt is deviating from center, a steering roll which can be skewed relative to the line of travel of the belt in order to steer the belt back into the proper alignment, and a roll steering mechanism for controlling the angle of the steering roll. In belt tracking systems of the prior art, the rolls are typically mounted on bearings which can tip or be deflected upward or downward. These undesired bearing motions may misalign and prematurely wear out the bearing or unduly stretch the belt. It also reduces the tracking effect of the roll which necessitates increased steering motion and further exacerbates the wear problem. The present invention includes a roll mounting system which overcomes these problems.

Some belt presses of the prior art include inclined wedge sections for preliminary dewatering of the slurry. These wedge systems are typically very difficult to adjust and do not include enough types of adjustment to enable them to optimally handle a variety of slurries. The present invention provides a wedge section which is easy to adjust and which adjusts in several different directions so as to provide optimum dewatering.

The drain systems in prior art belt presses increases the width of the press so that they may need disassembly for shipment. The width also increases the effective area which the belt press occupies and may constitute a safety hazard to people working around the machine. This invention provides an internal drain system that can accommodate large volumes of liquid from slurries, yet is easily accessible for cleaning or service.

In belt presses of the prior art, replacement of the belts has always required substantial time for disassembly of the press. The present invention provides simple means for replacing belts, from either side of the press, in a brief time period.

SUMMARY OF THE INVENTION

Accordingly, it is an object of this invention to provide a belt press having a lead-in wedge section having rolls which are vertically, axially and angularly adjustable relative to the belt for optimal adjustment of a wedge gap, wedge taper, and roll off-set or skew for the particular slurry, and a method of concentrating the solids in a slurry by carrying the slurry held between two foraminous belts through a tapering wedge formed by two racks of skewed rolls.

Another object of this invention is to provide a belt press having a belt tensioning mechanism that produces exactly equal extensions of the two ends of the take-up roll and also provides an additional belt take-up roll in the central region of the machine for additional take-up capacity, and for midpoint tensioning and shock absorption if desired.

Yet another object of this invention is to provide a belt press having a belt steering and control mechanism that produces gradual changes to the belt steering roll to prevent over-steering and "hunting" of the steering roll, and also securely anchors the roll bearing in a manner that permits smooth movement of the bearing in the direction of belt movement, but prevents tilting or cocking of the bearing on or about the steering structure.

A further object of the invention is to provide a belt press having a frame which has removable sections and internal jacks which facilitate rapid and easy removal and replacement of the endless belts, and which is symmetrical so that the belt can be removed and installed from either side of the machine.

A still further object of the present invention is to provide a belt press having an internal drain system capable of conveying large volumes of liquid without externally projecting drain pans and lines, but which is easily accessible for service and cleaning. The belt press also has a substantial percentage of the total belt length arranged in vertical paths for compactness and for shear as the belt changes directions. A polymeric doctor blade is biased against the belt at the exit and rolls by a composite spring which is adjustable at each end.

It is a further object of this invention to provide a belt press having structure and modes of operation that greatly extend the useful life of the belt.

BRIEF DESCRIPTION OF THE DRAWINGS

The invention and its many attendant objects and advantages will be better understood upon reading the following description of the preferred embodiment in conjunction with the following drawings, wherein.

DESCRIPTION OF THE PREFERRED EMBODIMENT

Figure 1:
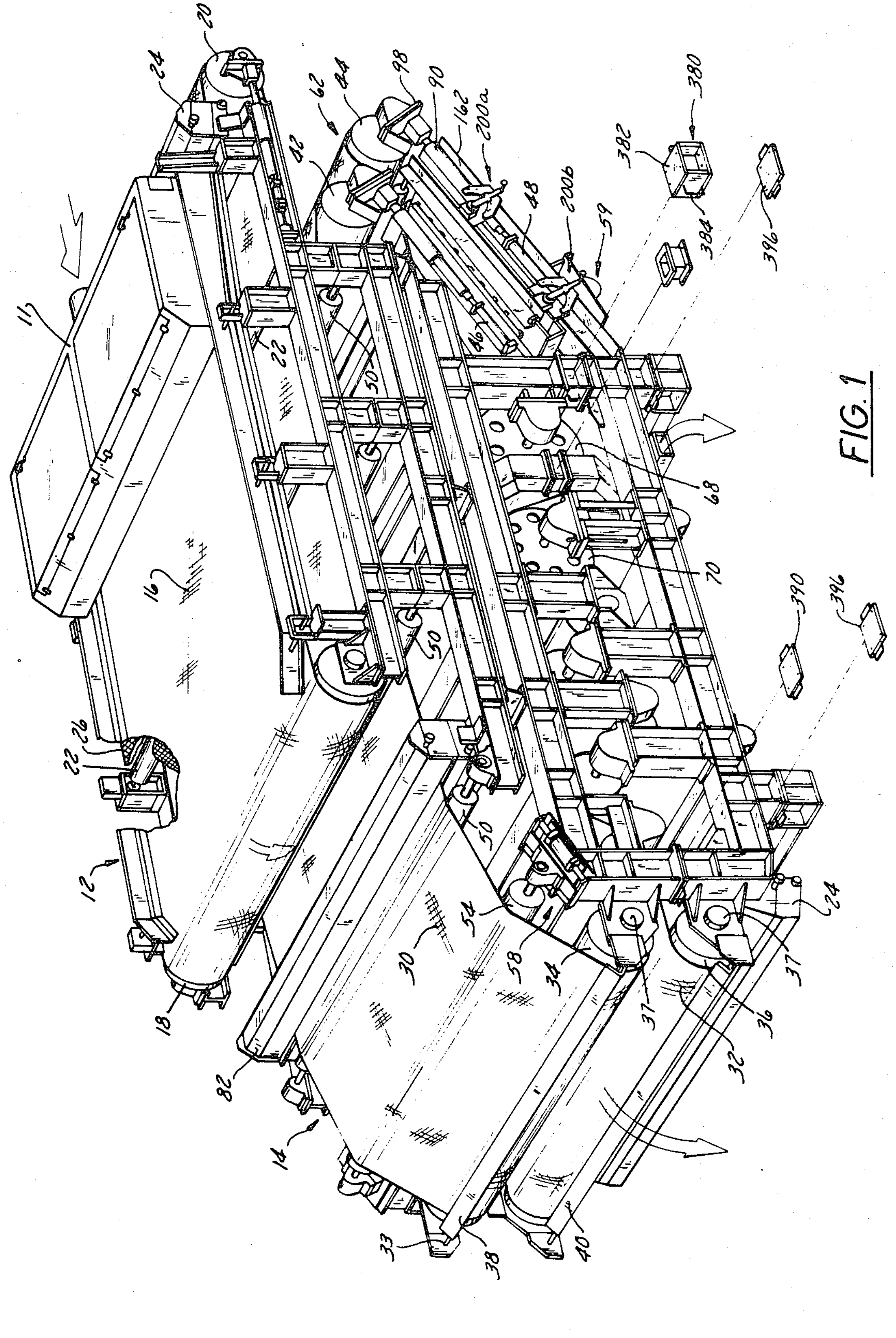
FIG. 1 is a perspective view of a belt press made in accordance with this invention.
Figures 2, 2A:
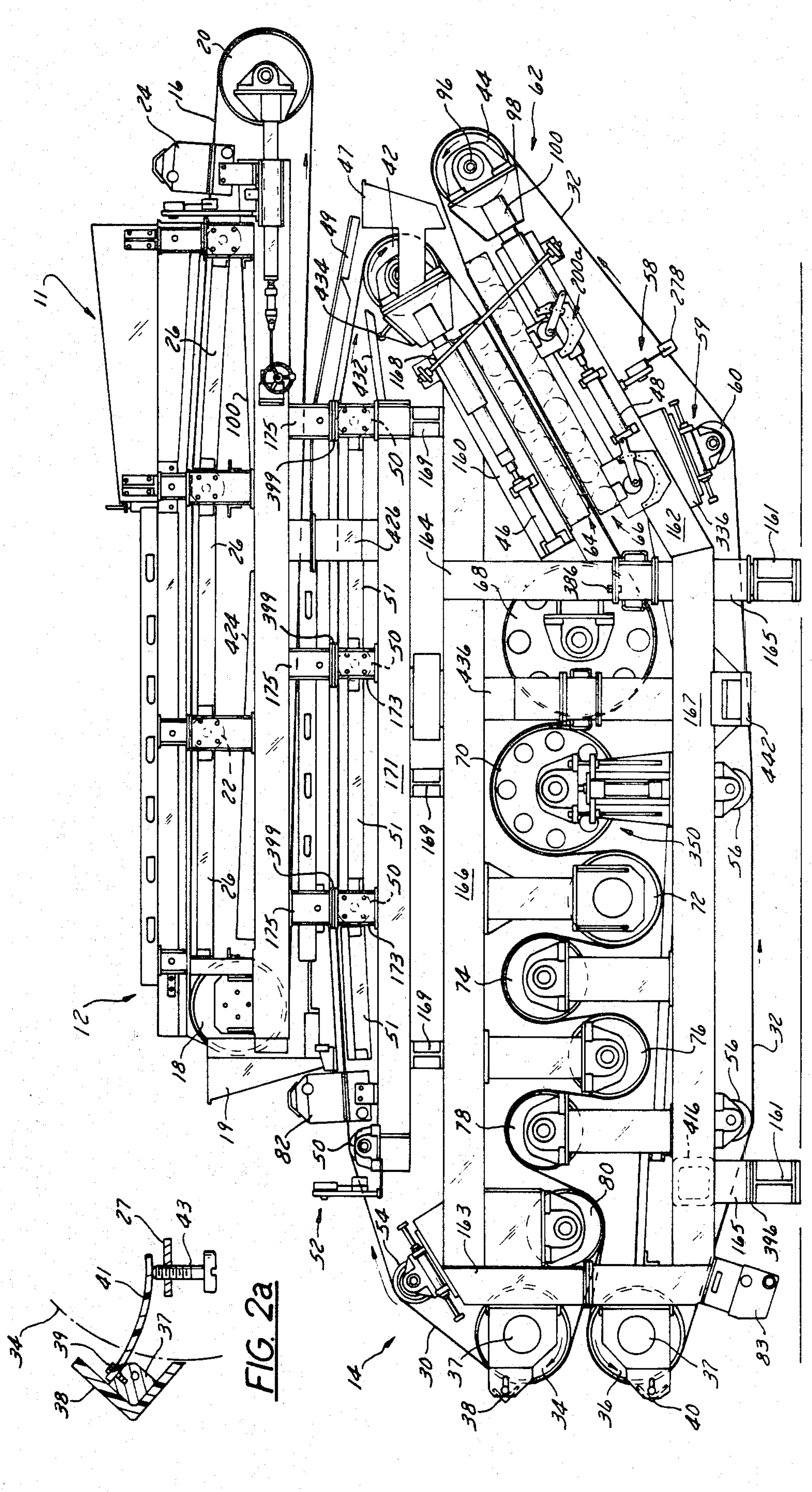
FIG. 2 is a side elevation of the belt press shown in FIG. 1.
FIG. 2*a* is a sectional elevation of the doctor blade at the exit end of the machine.

Referring now to the drawings wherein like reference numerals refer to identical or corresponding parts, and more particularly to FIGS. 1 and 2 thereof, a belt press according to this invention is shown. For the sake of clarity and convenience, the side of the belt press seen in FIG. 2 will be referred to as the "near" side, and the opposite side will be referred to as the "far" side. The end of the belt press to the right in FIG. 2 will be referred to as the "front" end, and the end to the left will be referred to as the "rear" end. The direction of belt movement in the wedge section 62 at the front end of the press will be referred to as the "axial" direction, and the direction across the machine, from side to side, will be referred to as the "transverse" direction. The machine is symmetrical about a vertical plane containing the longitudinal axis of the machine, parallel to the plane of FIG. 2. For the sake of succinctness, the description of one side will also be understood to apply to the other side as well, unless stated otherwise.

The belt press has an upper deck 12 and a lower deck 14. The upper deck 12 includes a single belt 16 which is driven by a drive roll 18 and is tensioned by a tensioning roll 20. The belt 16 is intermediately supported by a series of smaller rolls 22. The upper deck also includes a belt washer 24 and a distribution box 11 for receiving and spreading the slurry uniformly over the belt. The belt 16 is supported on a grid 26 made of polymeric material such as a filled polyester which is worn by the belt to produce a sharp leading ledge at the shoulder of each lateral piece of the grid in contact with the belt. The belt 16 is supported on the rolls 18, 20 and 22 so that, when unloaded, it runs above and out of contact with the grid 26 to reduce wear, and when loaded with slurry, runs in contact with the grid to facilitate removal of liquid from the underside of the belt. The rolls 22 also produce a more uniform wear pattern on the grid 26. This phenomonon has not been satisfactorily explained, but the grid wear is clearly more uniform and not as fast as it would be without the rolls 22. It is possible to operate the belt press lower deck 14 without an upper deck 12, in which case the slurry would be introduced directly onto the lower deck by means of a distribution box similar to the box 11 shown on the upper deck 12.

The lower deck 14 includes an upper belt 30 and a lower belt 32 which are driven by two drive rolls 34, 36 respectively. The belts are fine weave, endless polymeric mesh belts such as nylon mesh belts made by Appleton Wire, Appleton, WI. The drive motors are hydraulic motors 31 mounted directly on mounting brackets 29 projecting rearwardly from the frame, and are coaxial with the bearings for the rolls. The motors 31 drive planetary gear reduction units such as Torque Hub final drives (not shown) mounted within the rolls. The Torque Hub final drive is manufactured by Fairfield Manufacturing Company in Lafayette, Ind. under U.S. Pat. No. 3,737,000. Doctor blades 38, 40 are provided to scrape the dry cake off the belts. As shown in FIG. 2*a*, the doctor blades are biased against the belts by leaf springs 41, such as the Scotch Ply 1002 glass composite laminate spring made by 3M Company in Minneapolis, Minn. The springs 41 are fastened to the two ends of the doctor blades by screws 39 threaded into tapped holes in mounting blocks 37. Each block 37 is bolted to the doctor blade 38 and contains a hold 35 to receive a pinth pin 33. The composite springs 41 extend forwardly between the roll support brackets 29 and the roll and are held in an adjustably flexed position by screws 43 threaded into tabs 27 which project inwardly from the brackets 29.

Two tensioning rolls 42, 44 are provided at the head of front end of the press for tensioning the belts 30, 32 respectively. The tensioning rolls 42, 44 exert an adjustable uniform tension on the belts 30 and 32 by a tensioning system 45 which includes two hydraulic cylinders 46, 48. The belt tensioning system 45 will be described in more detail later. The upper belt 30 is supported along its top run by four small top rolls 50 which hold the belt off the grids when there is no slurry on the belt, for the same purpose as the rolls 22. A sensor 52 senses the belt position and controls a belt guiding roll 54 which maintains the belt in a straight tracking position. The guide system will be described in more detail later.

Similarly, the lower run of the lower belt 32 is supported by small rolls 56 which hold the belt downward to clear a lower drain trough. A sensor 58 senses the lateral position of the lower belt 32 and controls a steering control mechanism 59 for a steering roll 60, which maintains the belt 32 in proper alignment.

Figure 3:
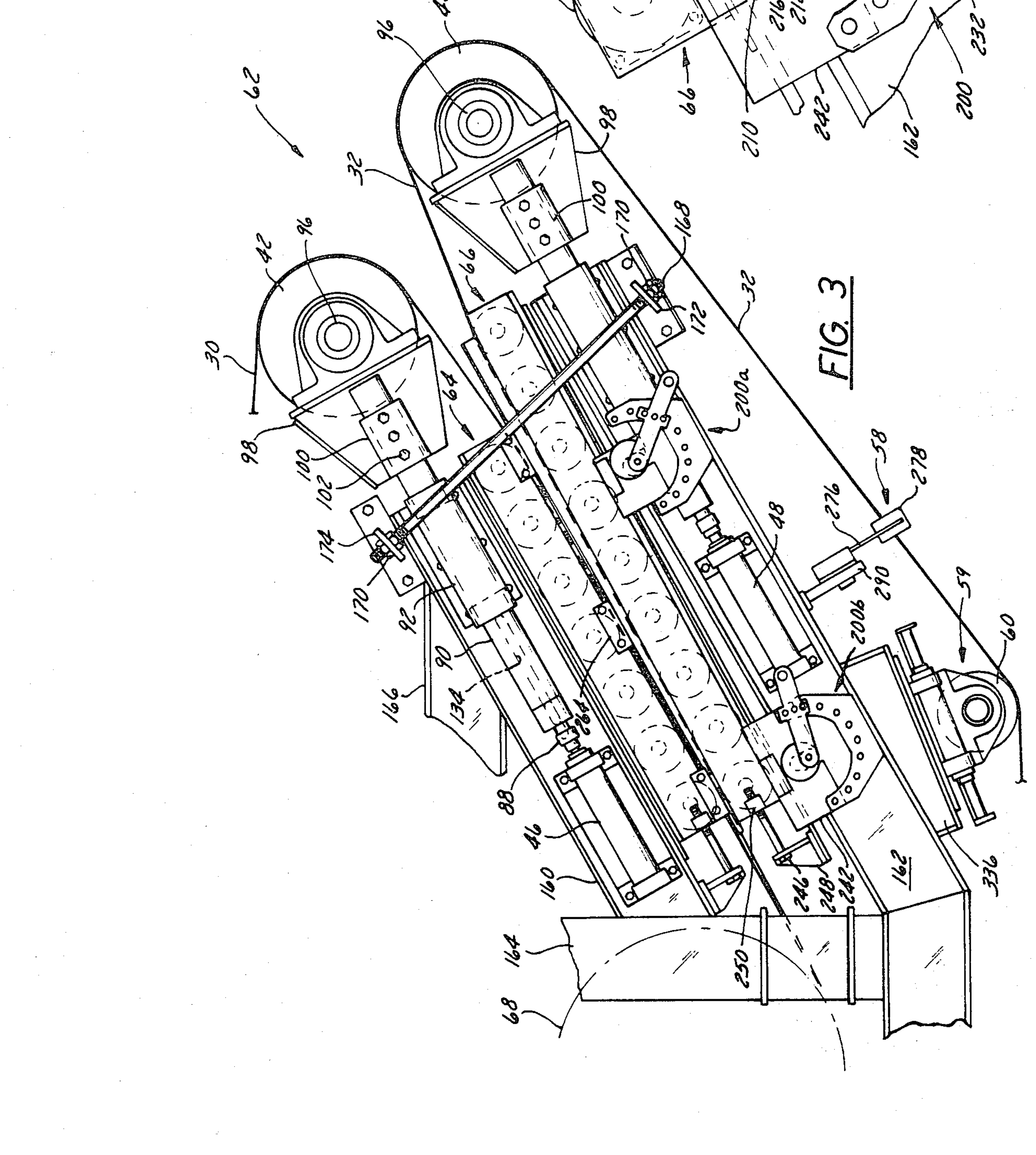
FIG. 3 is a side elevation of the wedge section of the belt press shown in FIG. 1.

The tensioning rolls 42, 44 are at the upper forward end of a wedge section 62, best illustrated in FIGS. 2 and 3. The belts 30, 32 enter the wedge section at a given gap or separation and then are gradually brought closer together by a pair of opposed racks of rolls 64 and 66 which press the liquid from the slurry. The position of the racks of rolls 64, 66 can be adjusted vertically, axially and angularly in order to achieve the best dewatering. The wedge section will be described in more detail later.

Referring again to FIG. 2, after the belts 30, 32 have passed out of the exit end of the wedge section 62, the belts move together in a serpentine path over a set of large rolls, beginning with two perforated rolls 68, 70. The perforated rolls 68, 70 have holes along their cylindrical surfaces and on their ends. The water drains into the rolls through the holes in their cylindrical surfaces and then flows out through the holes in the end plates of the rolls. In the case of the roll 70, the water will flow out the holes in the cylindrical surface in the bottom of the roll and also out the ends. In the case of the roll 68, the belts do not extend all the way to the edge of the cylindrical surface, so water flows out the holes which are beyond the edge of the belt and also out the holes in the ends. The pressure on the belts increases as the belts pass over the next five rolls 72, 74, 76, 78, and 80, until the cake is substantially dry. In the case of coal tailings slurry, the resulting cake has about 25–30% moisture.

The roll 70 is mounted on a vertically adjustable support which functions as a belt take-up and can also serve as a second belt tensioner which tensions both belts 30, 32. The mechanism for providing this tensioning will be described later.

The operation of the belt press is as follows: The slurry is pumped into the distribution box 11, which spreads it evenly over the belt 16. The belt 6 travels in a counterclockwise direction around the rolls 18 and 20 as shown in FIG. 2, and carries the slurry along the top run of the belt toward the drive roll 18, with water freely draining through the belt 16 along the way. The water is caught and conveyed away by a drain system described below. When the slurry reaches the tail or rear end of the belt 16, which is at the roll 18, it drops through a trough 19 onto the top run of the belt 30 just to the right of a belt washer 82. The top run of the belt 30 is moving to the right in FIG. 2, so the slurry reverses its direction, tumbles slightly which promotes water separation, and continues to drain freely as the belt 30 moves back toward the head end of the press. When the slurry reaches the front or head end of the press, which is at the tensioning roll 42, it is guided by a fence 49 into a trough 47 which funnels the slurry into the entry end of the wedge section 62 between the belts 30, 32. The slurry is carried through the wedge section 62 of the press where the water is gradually pressed out between the conveying belts 30, 32 by the upper and lower racks of rolls 64, 66 which apply gradually increasing pressure to the slurry. When the slurry emerges at the exit end of the wedge section 62 between the belts 30, 32, it is firmly compressed. It is carried by the belts in a serpentine path over and around the rolls 68, 70, 72, 74, 76, 78, 80, where it is subjected to shear by virtue of the multiple changes of direction, and also to gradually increasing pressure. When the belts emerge from the tail end at the rolls 34, 36 the cake is dry and is scraped from the belts by means of the doctor blades 38, 40. The belts 30, 32 are then backwashed by the belt wash units 82, 83 and the process continues with the belt 30 returning underneath the trough 19 to pick up more of the slurry, and the belt 32 returning forward under the machine back to the entry end of the wedge section 62.

Figure 4:
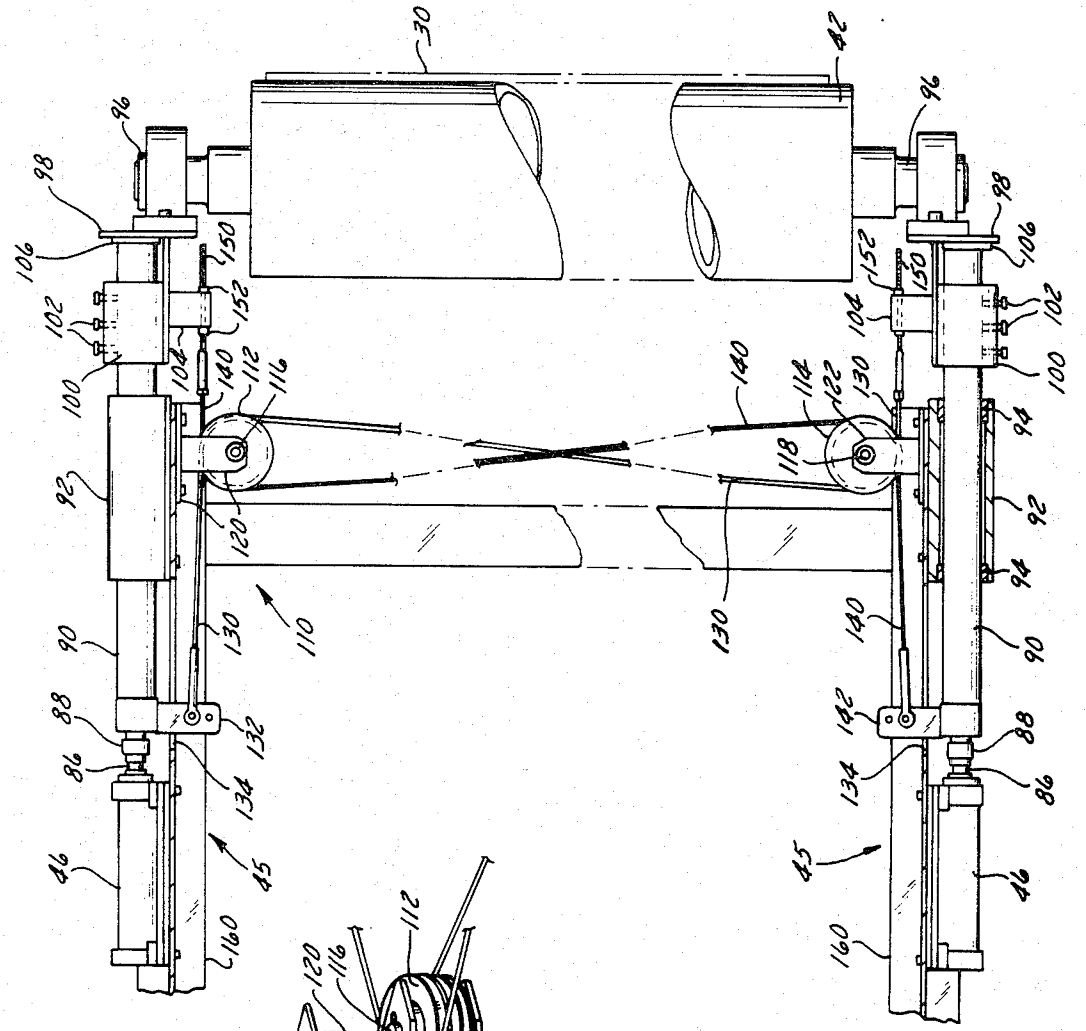
FIG. 4 is a plan view, partly in section, of a portion of the belt tensioning system, also showing the cable equalizer.
Figure 5:
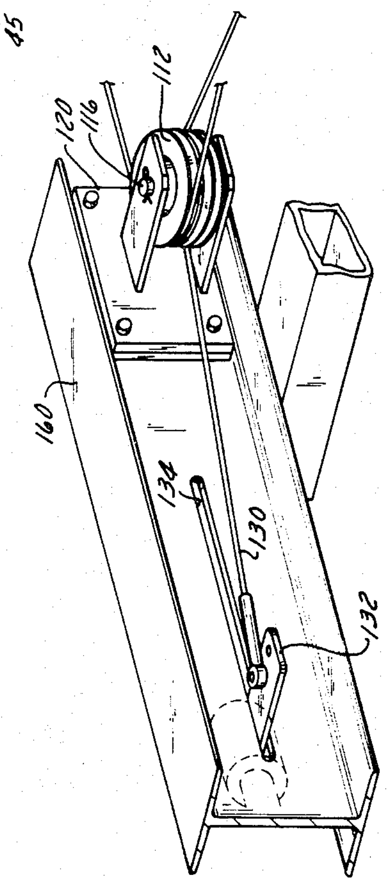
FIG. 5 is a perspective view of a portion of the cable equalizer shown in FIG. 4.

FIG. 3 shows an enlarged view of the wedge section 62 of the press, including the two racks of rolls 64, 66, belt tensioning rolls 42, 44 and the cylinders 46, 48. The belt tensioning system 45, shown in FIG. 4, shows only the upper portion of the wedge section 62 and the tensioning roll 42; it should be understood that a similar arrangement is provided for the lower tensioning roll 44.

The tensioning cylinders 46 are mounted on the frame of the belt press oriented parallel to the direction of belt travel. A piston 86 in each of the cylinders 46 is coupled by a coupling 88 to an extension rod 90. Each extension rod 90 is guided by an elongated cylindrical guide 92, which maintains the extension rod 90 operating in a straight line parallel to the other rod 90 and parallel to the direction of travel of the belt. The guides 92 are themselves mounted on the belt press frame. Each guide 92 is a cylindrical tube with a low friction sleeve bearing 94 mounted in each end. For example, the sleeve bearings 94 could be filament wound sleeve bearings, such as Duralon bearings manufactured by Rexnord Inc. or they could be greased bronze sleeve bearings.

The roll 42 is mounted for rotation on bearings 96 at each end of the roll. Each bearing 96 is mounted on a support bracket 98 which includes a cylindrical collar 100 which fits snugly on the end of the extension rod 90 and is secured in position by set screws 102. An inwardly projecting lug 104 is fastened to the bracket 98 for attachment of the cables of a cable equalizer.

It will thus be seen that when the pistons 86 move within their cylinders 46, they will cause an equal movement of the ends of the belt tensioning roll 42. Because the extension rods 90 are simply extensions of the pistons 86, they may be referred to in discussion simply as pistons. It should be noted that it would be possible to attach the pistons 86 to other types of fluidic actuators as well.

If, in operation, the belt stretches so far that the pistons 86 reach the end of their travel, an additional few inches of extension may be obtained by inserting a spacer block 106 between the end of each extension rod 90 and the bracket 98. This is accomplished by retracting the pistons 86 into the cylinders 46 to relieve the tension on the belt, loosening the set screws 102, loosening the cable connection to the lug 104, and inserting a spacer block 106 between the bracket 98 and the end of the extension rod 90. The cable and set screws are then retightened and the cylinders 46 are repressurized.

A cable equalizer 110 is provided to ensure that both ends of the roll 42 are extended and retracted an equal distance so that one piston does not move ahead of the other so as to skew the roll 42. The cable equalizer 110 includes a set of double pulleys 112 on the far side of the machine, and a set 114 on the near side. The pulleys are mounted on pulley shafts 116, 118 fixed in double armed brackets 120,122 anchored to the frame of the belt press. The double pulleys 112, 114 can each be made as a single, double groove pulley, or can be made as two separate single groove pulleys mounted on the same pulley shaft. If the pulleys are mounted so that they rotate relative to their shafts, they need not have the same diameter. However, if the two pulleys are fixed on the same shaft and the shaft then rotates relative to the frame, the pulleys must have the same diameter. It should be noted that the pulleys need not be mounted on the same shaft as shown here.

A first cable 130 is attached to an ear 132 fastened to the end of the extension rod 90 adjacent the coupling 88. The ear 132 extends through a slot 134 in the belt press frame which is as long as the maximum extension of the piston 86. The cable 130 is trained around the lower half of the pulley 112, across the width of the belt press, around the lower half of the pulley 114, and is attached to the lug 104 on the near side of the press. Similarly, a second cable 140 is attached at one end to an ear 142 fstened to the end of the extension rod 90 on the near side of the machine adjacent to the coupling 88. The cable is trained around the upper half of the pulley 14, across the width of the belt press, around the upper half of the pulley 112, and is then attached to the second lug 104 on the far side of the belt press. Each of the cables is swaged at its forward end to a threaded rod 150. The length of the cable between its connection at the ear on one side of the press and its connection to the lug on the other side of the press can be adjusted without removing the cable from the system by adjusting a pair of nuts 152 on each side of the lug 104 which fix the position of the rod 150 in the lug 104.

The cable system operates as follows: If the piston 86 on the far side begins to move out ahead of the piston 86 on the near side of the belt press, the cable 140 which is attached to the ear 142 on the near side which is not moving will be placed under greater tension than the cable 130 and will pull the near side ear 142 forwardly an amount equal to forward movement of the far side ear 132, thereby ensuring that both sides move forward equally. Likewise, if the piston 46 on the near side begins to move out ahead of the piston 46 on the far side, the cable 130, which is attached to the near side lug 104, will pull on the far side ear 132 so that synchronous and equal movement of both ends of the roll 42 is achieved. A similar process will occur when the pistons 86 are retracting back into the cylinders 46 to increase the tension on the belt. The key to the success of this system is that the length of the cables does not change. Therefore, once the cables are pretensioned equally so as to put the system into alignment, they will ensure that the extension and retraction movement on both sides of the press are equal.

The cable equalizer is self-cleaning. Unlike a rack and pinion system, which tends to pack slurry solids into the teeth of the rack, this cable equalizer cleans the cable and the pulley grooves as the cable runs around the pulleys. Thus, there is not need for special covers and seals, as required for prior end rack and pinion systems.

Unlike many other alignment systems, the cable equalizer 110 does not carry the full force of the pistons 86. Instead, this cable system need only carry the difference in forces exerted on the two pistons 86. In other words, if the pistons 86 are moving together under the influence of the hydraulic force of the cylinders alone, the cables have no work to do. It is only when there is some imbalance between the forces exerted on the two pistons 86 that the cable equalizer 110 takes effect. In order to avoid stretching of the cables 130, 140, they are pretensioned during installation so as to carry a force greater than the maximum differential force between the two pistons 86. When the cable equalizer 110 is installed, the cables are fastened to their respective attachment lugs and ears and then are adjusted by means of the nuts 152 until the belt tensioning roll 42 is at right angles to the direction of travel of the belt. That angle between the belt tensioning roll and the belt will thereafter be maintained by the cable system.

The wedge section 62 shown in FIG. 3 is provided with a structure which facilitates adjustment of the thickness and taper angle of the converging gap between the belts 30 and 32. It also enables the racks 64 and 66 of rolls to be offset from each other axially (that is, in the direction of belt travel through the gap) so that the slurry will follow a corrugated path of travel between the rolls. Finally, it enables the racks 64 and 66 to be offset from each other angularly so that one or both racks of rolls is skewed from its normal position perpendicular to direction of belt travel. These adjustments are to enable the wedge section 62 to be optimally adjusted for the characteristics of the slurry being treated.

As shown in FIGS. 2 and 3, the racks of rolls 64 and 66 are mounted on beams 160 and 162. Both beams 160 and 162 are attached at their rear ends to a vertical beam 164 of the machine frame which includes front and rear vertical beams 164 and 163 supporting a main longitudinal top beam 166 on a main longitudinal bottom beam 167, supported in turn by two axially spaced vertical legs 165 which stand on two transversely extending base beams 161. Three transversely extending beams 169 lie atop and are supported by the main top beam 166 and in turn support an overlying beam 171 which carries all four top rolls 50 and three axially spaced, vertical stump legs 173 in the form of short I-beam sections on which the bearings for the rolls 50 are mounted and which also support three vertically aligned legs 175 which carry the upper deck 12.

The upper wedge section beam 160 is supported at its forward end by a forward extension of the main top beam 166. The lower wedge section beam 162 is cantilevered at its connection to the frame at its rear end, but in operation is supported at its front end by a tie rod 168 which is pretensioned to maintain the predetermined gap at the lead-in end of the wedge section 62. The connection of the beam 162 to the vertical beam 164 is a rigid welded connection, but it could be a pinned connection to prevent the exertion of a moment on the forward end of the bottom beam 167. The tie rod 168 may be pretensioned by the nuts 170 threaded onto the ends of the rod and bearing against brackets 172, 174 through which the rod 168 extends.

Figure 7:
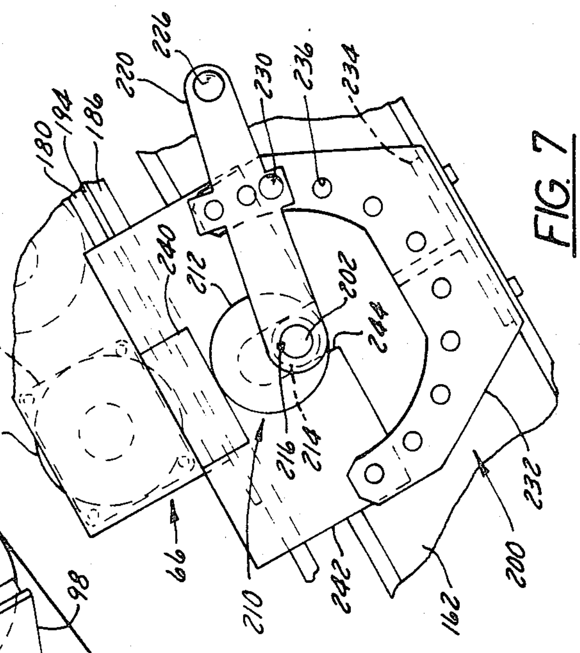
FIG. 7 is an enlarged elevation of the cam mechanism shown in FIGS. 3 and 6.
Figure 6:
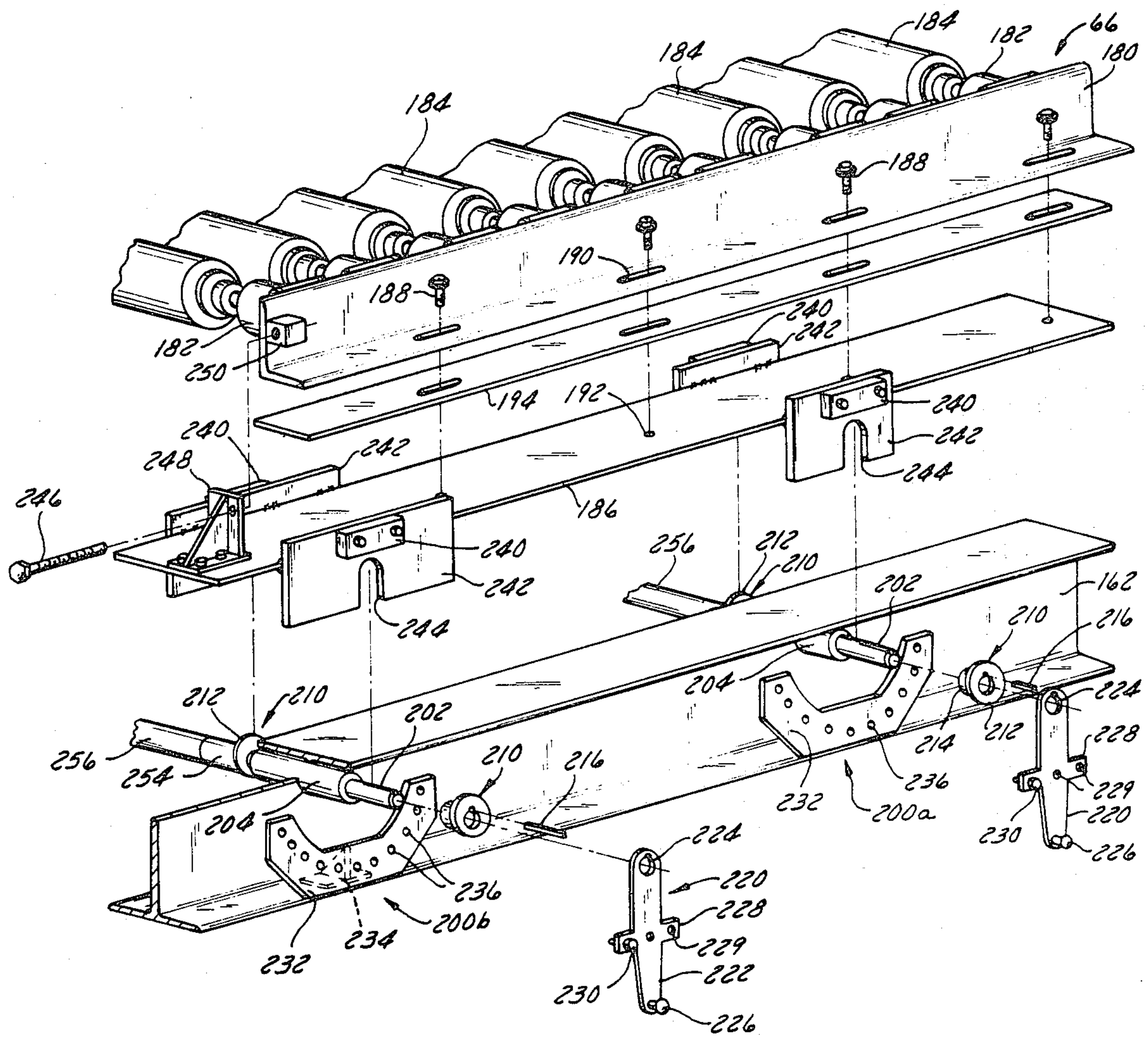
FIG. 6 is an exploded perspective view of the wedge adjustment mechanism shown in FIG. 3.
Figure 8:
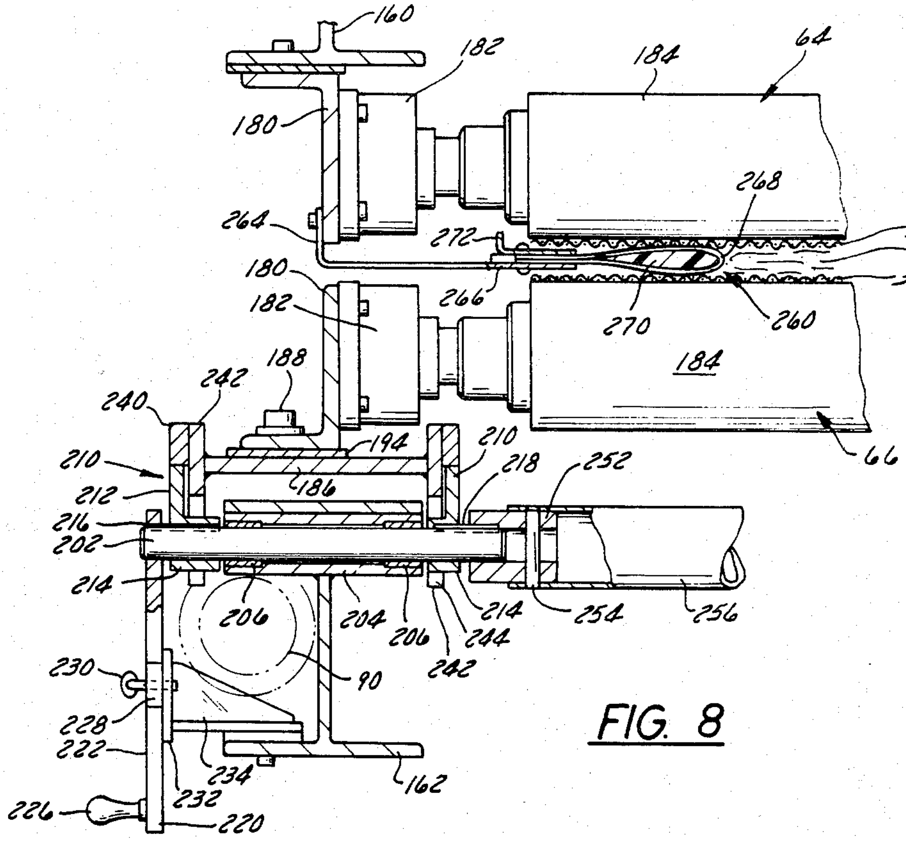
FIG. 8 is a sectional elevation of one side of the wedge section shown in FIG. 3.

The adjustment mechanisms for the wedge section roll racks is shown more clearly in FIGS. 6–8. The lower rack of rolls is shown supported on the lower near side beam 62. Each roll rack includes a pair of laterally spaced side bars 180 (only one of which is shown in FIG. 6). The side bars 180 have mounted thereon a series of axially spaced bearings 182, each of which supports one end of a roll 184 for rotation about its own axis. The side bars 180 are mounted on a mounting plate 186 by screws 188 which pass through elongated holes 190 in the side bars 180 and are threaded into threaded holes 192 in the mounting plate 186. A bearing plate 194 formed of a material such as ultra high density polyethylene or stainless steel can be interposed between the mounting plates 186 and the side bars 180 to facilitate the adjusting motion of the side bars 180 relative to the mounting plates 186. When the side bars 180 have been shifted to their adjusted position, the screws 188 are tightened to hold the side bars securely in position.

A cam operated gap adjustment mechanism 200 is provided for independently adjusting the vertical position of each end of the bottom rack of rolls 66 so the gap and the taper angle of the converging wedge between the racks 64 and 66 can be adjusted. The gap adjustment mechanism includes two identical assemblies 200*a* and 200*b* positioned adjacent the two axial ends of the lower roll rack 66. Only one of these, assembly 200*a*, will be described with the understanding that the other assembly 200*b* is identical to it and the description will apply as well.

The mechanism 200*a* includes a stub shaft 202 mounted in a cylindrical bearing housing 204 which in turn is disposed in a hole through the beam 162 just beneath the top flange thereof and is fastened thereto as by welding or bolts. The bearing housing lies transversely to the beam 162 and, as shown most clearly in FIG. 8, has a filament wound sleeve bearing 206, such as the previously mentioned Duralon bearings, disposed in each end. A cam 210 is keyed to the stub shaft 202 on each side of the bearing housing 204 and includes a circular cam disc 212 and an integral socket 214 mounted eccentrically on the disc 212. The socket has a bore for receiving the stub shaft 202 and a keyway to receive a key 216 on the outside, end, and a key 218 on the inside and by which the cams 210 and the stub shaft 202 are fixed together against rotation.

A handle 220 is keyed to the outer end of the stub shaft 202 for manual rotation of the cam 210. The handle 220 includes an elongated body 222 having a bore 224 at one end for receiving the end of the stub shaft 202 and having a keyway for receiving the key 16. A hand grip 226 is provided at the other end of the handle for manual grasping or to engage a lever by which the effective length of the handle may be increased. A midpoint arm 228 projects from both sides of the body 222 and is provided with a series of three holes 229 which are sized to receive a threaded peg 230. An arcuate anchor plate 232 is fixed to the beam 162 by a bracket 234 and is provided with a series of threaded holes 236 sized to receive the peg 230.

In use, the handle 220 is turned by hand to rotate the stub shaft 202 and the cam 212 keyed thereto. When the desired adjustment has been attained the peg 230 is inserted through whichever of the holes in the arm 228 is most closely aligned with one of the holes 236 in the anchor plate to hold the handle 220 and the cam 212 in the desired position.

The cam 212 is aligned and engaged with a cam block 240 which in turn is fastened to an alignment plate 242. A downwardly opening slot 244 is formed in the plate 242 in alignment with the axis of the stub shaft 202. The slot 244 fits over the socket 214 of the cam 210 and prevents the mounting plate 186 from moving axially along the beam 162 but allows it to move vertically at either or both ends.

The mounting plate 186 thus makes it possible to vertically adjust the roll rack at either or both ends by use of the cam mechanism 200. The axial position of either side bar 180 may be controlled by loosening the screws 188 and turning a bolt 246 which is axially fixed in a hole in an end bracket 248 and is threaded into a threaded hole in a block 250 fastened to the rear end of the side bar 180. The screws 188 are retightened after the side bar has been shifted to the desired position.

A coupling 252, shown best in FIG. 8, is keyed to the inner end of the stub shaft 202 with the same key 218 by which the inner cam 210 is keyed to the shaft. The coupling is a cylindrical ferrule having a diametrical hole drilled through it for receiving a pin 254. A torque tube 256 is fitted telescopically over the ferrule 254 and the pin 254 is forced through a pair of diametrical holes in the end of the torque tube 256 and the hole in the ferrule. The other end of the torque tube 256 is coupled to a corresponding cam operated gap adjustment mechanism on the other side of the belt press to ensure that the rack side bars 180 on both sides of the mechanism are vertically adjusted an equal amount and together. Normally, the adjustment will be made by a person on each side of the machine for ease of operation.

Figure 9:
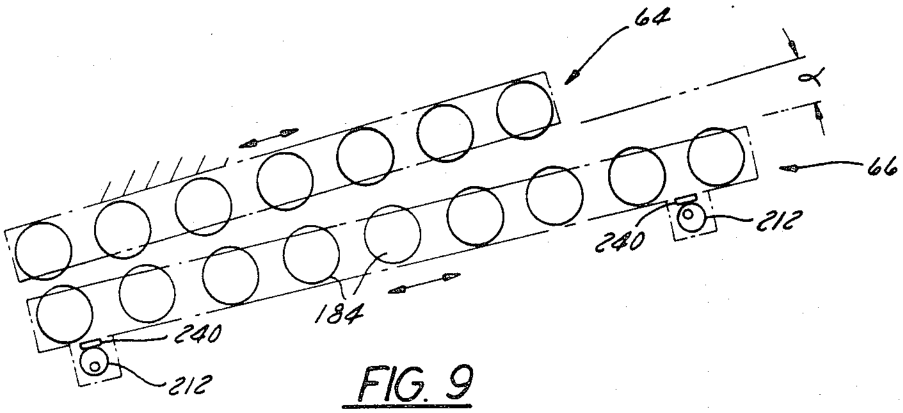
FIGS. 9–11 are schematic diagrams illustrating the types of adjustment made possible by the mechanisms shown in FIG. 6.

The adjustments to the wedge section roll racks 64 and 66 made possible by this invention are illustrated schematically in FIGS. 9–13. The independent vertical adjustment of the racks at each end of the wedge section is illustrated in FIG. 9. By selectively rotating the cams 212, the gap between the racks 64 and 66 may be adjusted at each end which enables adjustment of the thickness of the gap and the gap angle $\alpha$. A wide gap will be selected for slurries having a high solids content or for relatively incompressible slurries. A large gap angle $\alpha$ will be used for compressible slurries containing a large proportion of liquid and whose liquid is not tightly bound in the slurry so that it can be compressed and drained without squirting out of the sides of the wedge section.

Figure 10:
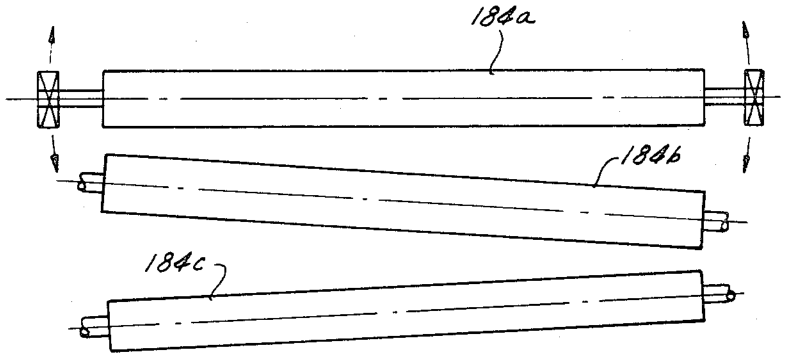

The skew adjustment illustrated in FIGS. 10–13 utilizes the capability of the side bars 180 of both roll racks 64 and 66 to be adjusted axially. The top roll 184 in FIG. 10 shows the straight position in which the rolls 184 lie straight across the belts perpendicular to their direction of travel. The roll 184*b* shows the position of the rolls when the near side side bar 180 is moved toward the rear and the far side side bar is moved toward the front. If the adjustment would introduce excessive misalignment to the bearings 182, spherical bearings may be used. The roll 184*c* shows the roll position when the side bars 180 are reversed from the position in roll 184*b*.

Figure 11:
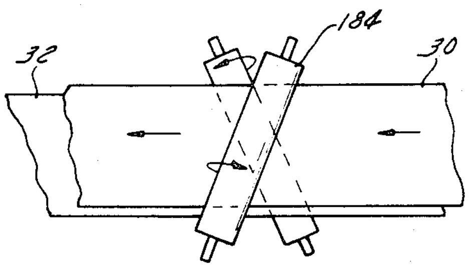
Figure 12:
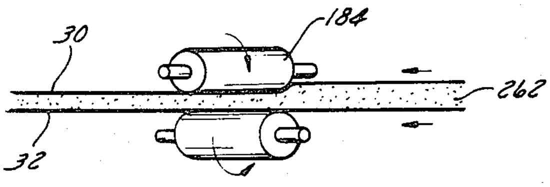
FIGS. 12 and 13 are schematic elevations of the skewed roll configuration shown in FIG. 11.

The purpose and result of skewing the rolls 184 is illustrated in FIGS. 11 and 12. Slurry held between the belts 30 and 32 passes between the rolls 184 disposed at equal and opposite angles to the direction of belt movement, as shown in FIG. 11. As the slurry approaches a roll 184 on the top rack 64, it will be subjected to a rolling force in a direction parallel to the plane of the belt and perpendicular to the axis of the roll 184, as well as the normal vertical compressive force which tends to flatten the slurry charge 262 as illustrated in FIG. 12. A lateral component of the rolling force exerted by the skewed rolls 184 tends to move the slurry charge transversely across the belt. Thus, as the slurry approaches the next roll, which will be on the rack 66, it will be subjected to a lateral force in the opposite direction across the belt. This oscillating lateral force on the slurry, imposed on the periodic compressive forces exerted by the rolls 184, tends to free liquid that would otherwise remain trapped within undisturbed voids in the slurry solids.

Figure 13:
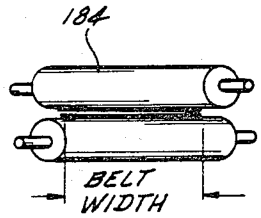

As shown in FIG. 13, the roll length and angle is selected to ensure that the belt does not extend beyond the foreshortened length of the roll at its angular position.

An edge seal 260, best shown in FIG. 8, is disposed between the two racks of roll 64 and 66 to prevent the slurry charge 262 from being squeezed out sideways between the belts 30 and 32 in the wedge section 62. The edge seal includes a number of brackets 264 (three are shown in FIG. 3) which are fastened to an elongated bar 266 which runs the full length of the racks 64 and 66. A folded-over roll 268 of fabric material filled with a foamed polymer 270 such as polypropylene is held and sealed shut by a second elongated bar 272 fastened to the first bar 266 with the ends of the fabric roll 268 caught and clamped in between. The fabric roll with its foam filling lies between the upper belt 30 and the lower belt 32 and prevents the slurry charge 262 in the wedge section 62 from squeezing laterally out the sides.

Figure 14:
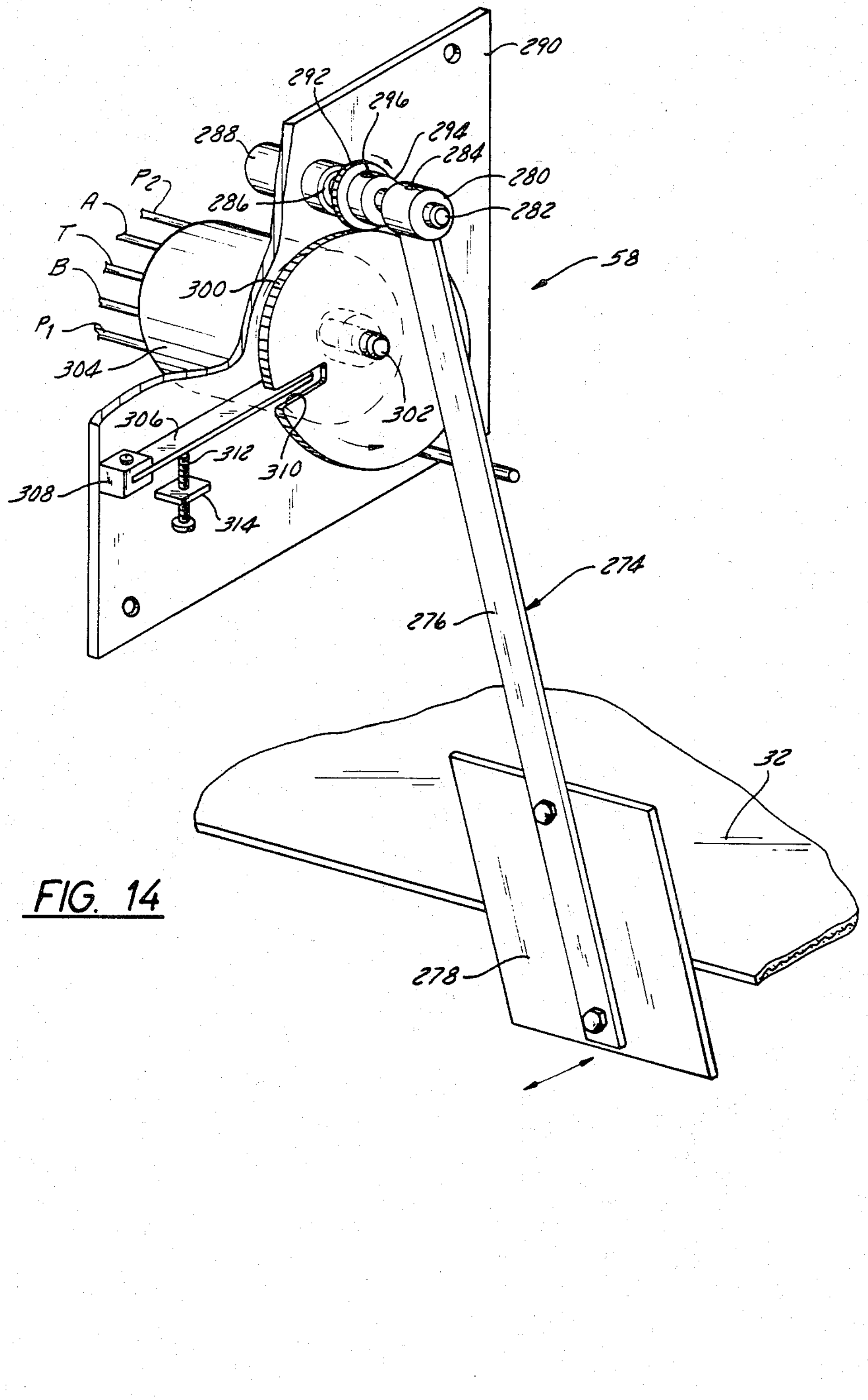
FIG. 14 is a perspective view of the roll steering mechanism shown in FIGS. 2 and 3.
Figure 15:
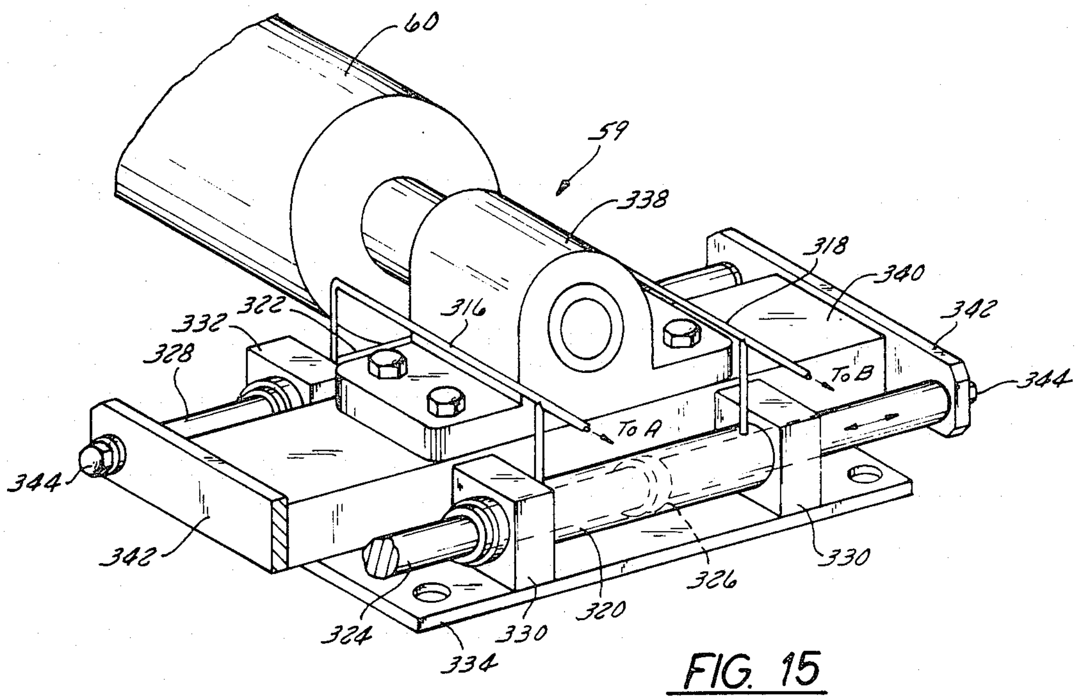
FIG. 15 is a perspective view of the belt sensor and control device shown in FIG. 2.

The belt tracking mechanism, shown in FIGS. 14 and 15, includes the belt edge sensor and control device 58, shown in FIG. 14 and the steering roll actuator mechanism 59, shown in FIG. 15, controlled by the control device 58. Looking first at FIG. 14, the belt edge sensor and control device 58 includes a paddle 274 having a paddle arm 276 and a paddle pad 278 fastened to the depending end of the arm 276. The pad 278 is formed of a low friction material such as high density polyethylene and bears gently against the edge of the belt to sense the position of the belt edge.

The top end of the arm 276 is welded to a set collar 280 which is fixed to a cantilevered end of a control shaft 282 by a set screw 284. Swinging motion of the arm 276 as it follows the edge of the belt 32 causes the control shaft 282 to rotate in a sleeve bearing 286 held in a cylindrical bearing cartridge 288 which is fixed to a base plate 290.

A pinion 292 is coaxially disposed on the control shaft 282 and is fixed thereon by a set collar 294 welded to the pinion and fixed to the shaft 282 by a set screw 296. The pinion is engaged with a gear 300 which is connected to a control spindle 302 of a hydraulic control valve 304. The valve can be any suitable type, although the preferred valve is a controlled leakage rotary valve such as a model 375-SL-MG valve made by Mocrotork, Inc. in Redbank, N.J. This valve has two alternative pressure ports $P_1$ and $P_2$, two feed ports A and B, and a tank port T. When the arm 276 is at its centered (vertical) position, the control element in the valve 304 is centered and the pressure to both feed lines A and B is equal. When the belt is shifted laterally one way or the other, the arm follows the belt edge and rotates the control shaft 282 which rotates the pinion 292. The gear 300 is rotated by the pinion 292 which turns the control spindle 302 to move the valve control element (not shown) off center. This increases the flow area through the valve control surface from one of the feed lines A or B to the tank line T and decreases the flow area from the pressure line $P_1$ to that feed line. At the same time, it increases the flow area through the valve control surfaces from the pressure line $P_1$ to the other feed line while reducing the flow area to the tank line. The result of this shift of the valve control element is to increase the hydraulic pressure in one of the feed lines and decrease it in the other feed line. These hydraulic signals are converted by the actuator 59 into mechanical steering motion of the steering roll 60, as will be described below.

The bias of the paddle 274 against the belt edge is accomplished by a glass composite leaf spring 306, such as the previously mentioned Scotch Ply spring, acting on the gear 300. the glass composite spring 306 is anchored to the base plate 290 by a clamp 308 and extends inwardly toward the gear 300. A radial slot 310 in the gear 300 receives the end of the glass spring and provides the means by which the spring can exert a torque on the gear 300. The torque on the gear 300 is reduced by the pinion 292 to a gentle biasing torque on the arm 276 toward the edge of the belt 32. Since the arm swings no more than about 60° at the most in operation, and this swing is reduced by the pinion/gear reduction, the gear 300 will rotate no more than about 10°–15° in operation. Thus, the slot 310 in the gear 300, which is about 90° away from the pinion 292, will never be rotated up to the pinion.

The force of the spring 306 on the gear 300 can be adjusted by an adjustment screw 312 threaded into a bracket 314 fastened to the base plate. The end of the screw 312 bears against the underside of the glass composite spring 306 to give an upward bias to the spring in addition to its fixed bias set by the angle at which the clamp holds the spring. A cover, not shown, is screwed to the base plate over the gear and pinion to keep the gears clean. The cover has a portion of its bottom edge cut away to prevent interference by the cover with the arm 276 when it swings through its full range of motion.

The belt edge sensor and control device 58 shown in FIG. 14 controls the steering roll actuator mechanism 59 shown in FIG. 15. A pair of fluid lines 316 and 318 connected to ports A and B of the Microtork rotary control valve 304 are connected to opposite ends of a pair of parallel cylinders 320 and 322. A piston rod 324 extends from both faces of a piston 326 in the cylinder 320, and a corresponding rod 328 extends from both faces of a piston (not shown) in the cylinder 322. The cylinders are mounted on axially aligned blocks 330 and 332 fixed to an anchor plate 334 which is fixed by screws (not shown) to a plinth 336, shown in FIG. 3, welded to the frame.

The steering roll 60 is mounted at its two ends in bearings 338, only one of which is shown in FIG. 15. The bearing (not shown) on the far side of the roll 60 is fastened rigidly to the frame; the bearing on the near side of the roll is mounted on a slide block 340 of the steering roll actuator mechanism 59. The slide block 340 is slidably disposed between the mounting blocks 330. A pair of identical end plates 342 are welded to the ends of the slide block 340 and extend laterally beyond it on both sides. A bolt 344 at each end of the end plates 342 secures each laterally extending end of the end plates 342 to one end of the rods 324 and 328, respectively.

In operation, if the belt ever mistracks so that it begins shifting toward one or the other lateral sides of the machine, this shift will be detected by the belt edge position sensor and control devie 58 which produces a charge in the hydraulic circuit to the steering roll actuator 59. For example, if the belt mistracks toward the far side, the paddle will follow that movement and, through the pinion 292 and the gear 300, rotate the control element of the valve to increase the pressure to the B port and decrease the pressure to the A port slightly. This causes a slight shift of the pistons 326 in the cylinders 320, 322 toward the rear. The steering roll 60 controls the lateral position of the belt because the belt tends to run perpendicular to the axis of the roll 60. To steer the belt toward the far side of the machine, the near side of the roll 60 is moved toward the front end of the belt press. This causes the belt to gradually work its way toward the far side. The plane of the face of the plinth 336 to which the anchor plate 334 is attached is perpendicular to the plane bisecting the angle formed by the belt where it passes over the roll 60. This ensures that the movement of the near end of the roll 60, under operation of the actuator 59, will produce as little stretching of the belt as possible. When the belt reaches its center position, the paddle following the belt edge also reaches its center position and centers the control element in the valve 304 to equalize the pressure in the cylinders 320 and 322.

The belts 30 and 32 can be operated under considerable tension which, in time, produces significant elongation of the belt. The belt tensioning system 45 shown in FIG. 4 can accommodate a portion of this elongation, but this invention also provides an additional belt take-up mechanism 350 in the central portion of the machine. The mechanism 350 is disclosed as a belt take-up mechanism only, but it was designed to function as an additional belt tensioning and shock absorption system to supplement the tensioning exerted by the system 45. The additional belt tensioning system will be described after description of the additional belt take-up mechanism 350.

Figure 16:
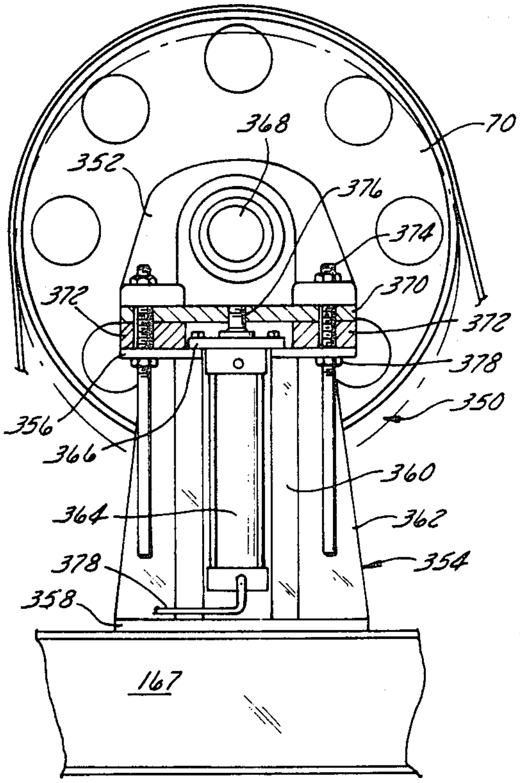
FIG. 16 is an enlarged elevation of the center take-up roll and the actuating mechanism therefor shown in FIG. 2.

As shown in FIG. 16, the take-up adjustment mechanism 350 supports a bearing 352 for the roll 70 on the lower frame beam 167. A stanchion 354, welded to the lower frame beam 167, includes a top plate 356 and a base plate 358 separated by an outwardly opening U-shaped channel 360, each side of which is braced by a buttress 362. A hydraulic cylinder 364 is fastened by its mounting flange 366 to the center of the top plate 356 and depends downwardly therefrom through a central hole in the top plate between the vertical legs of the channel 360.

The pillow block bearing 352, supporting a shaft 368 of the roll 70, is mounted on a bearing plate 370. Two spacer blocks 372 are interposed between the bearing plate 370 and the top plate 356, and the bearing 352 is secured in place by four bolts 374 which extend through holes at all four corners of the base of the bearing housing, the bearing plate 370, and the stanchion top plate 356.

A piston (not shown) in the cylinder 364 has an upwardly extending piston rod 376, threaded at its outer end. The threaded end of the rod 376 is screwed into a threaded hole in the center of the bearing plate 370 to provide the connection between the cylinder 364 and the bearing 352.

In operation, the additional belt take-up system 350 is typically used when the belt tensioning system 45 has reached the end of its travel. In prior art belt presses, this would necessitate replacement of the belt even though it still had plenty of useful life. In the belt press of this invention, the belt tensioning system 45 is retracted to its fully retracted position, nuts 378 on the bolts 374 are loosened, and the cylinders 364 on both sides of the machine are pressurized to lift the roll 70 vertically upward. A set of spacer blocks 372 and shims, sized to give the desired extension, are inserted between the bearing plate 370 and the stanchion top plate 356 on both sides of the machine and the pressure in the cylinder 364 is relieved to allow the bolts 374 to be tightened down, securing the bearing 352 to the stanchion 354. The spacer blocks 372 on both sides of the bearing 352 and both ends of the roll 70 are exactly the same height to ensure that the axis of the roll 70 remains exactly parallel with the plane of the belt. The tensioning system 45 is then repressurized to re-exert the desired tension on the belt and the belt press is ready to resume operation.

The belt take-up system 350 is designed to be modified to function as a central belt tensioning and shock relief system. In this modification, the spacer blocks 372 are removed and the cylinders 364 on both sides of the machine remain pressurized to exert an upward force on the roll 70 slightly exceeding the downward force exerted by the belts on the roll 70 at the designed belt tension. When the tension momentarily increases because of some blockage or perturbation in the operation, the belt tension will increase and the downward force on the roll 70 will increase. It normally takes a moment for this increased belt tension to be felt at the front end of the machine when the hydraulic cylinders 46, 48 acting on the rolls 42, 44 can be set to yield to a predetermined force. The placement of a bolt tensioner and shock absorber on the roll 70 eliminates damaging shock peaks to preserve belt life. A cable equalizer like that shown in FIG. 4 would be used to ensure equal displacement of the two ends of the roll 70 when the downward force on the roll 70 exerted by the belts exceeds the upward force on the roll 70 exerted by the piston rods 376.

Figure 17:
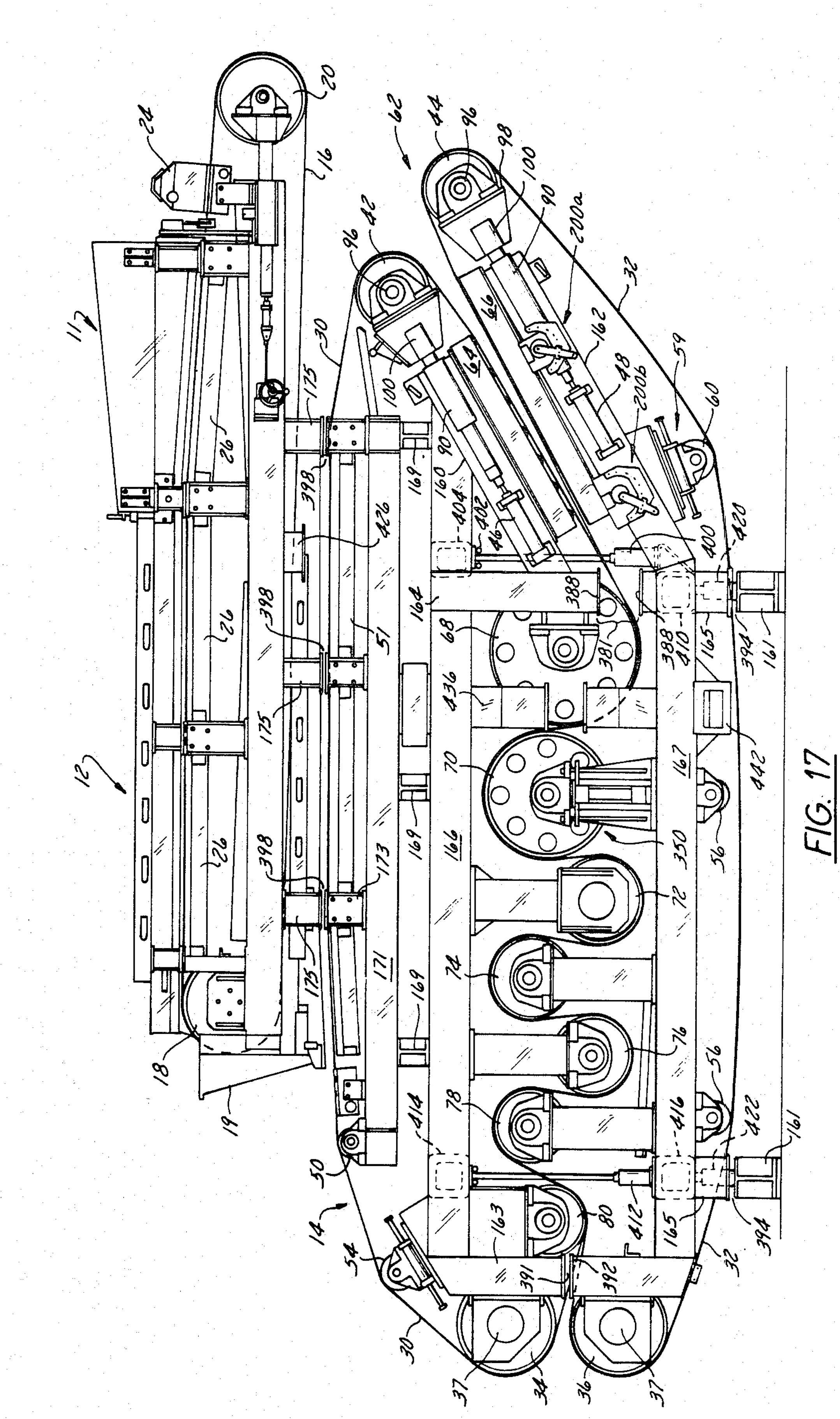
FIG. 17 is a side elevation of the belt press shown in FIG. 2, but adjusted for belt replacement.
Figure 19:
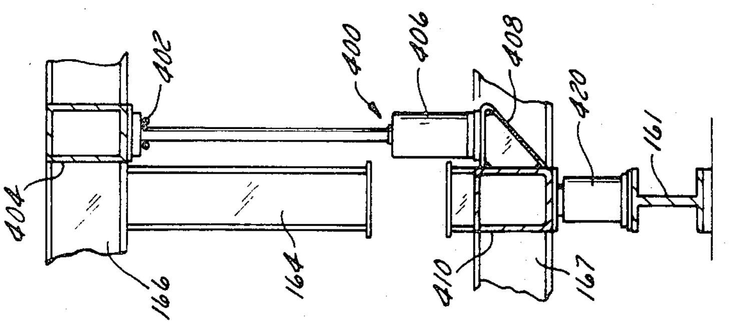
FIG. 19 is a sectional side elevation of a portion of the frame along lines 19—19 showing two of the jacks in place.
Figure 18:
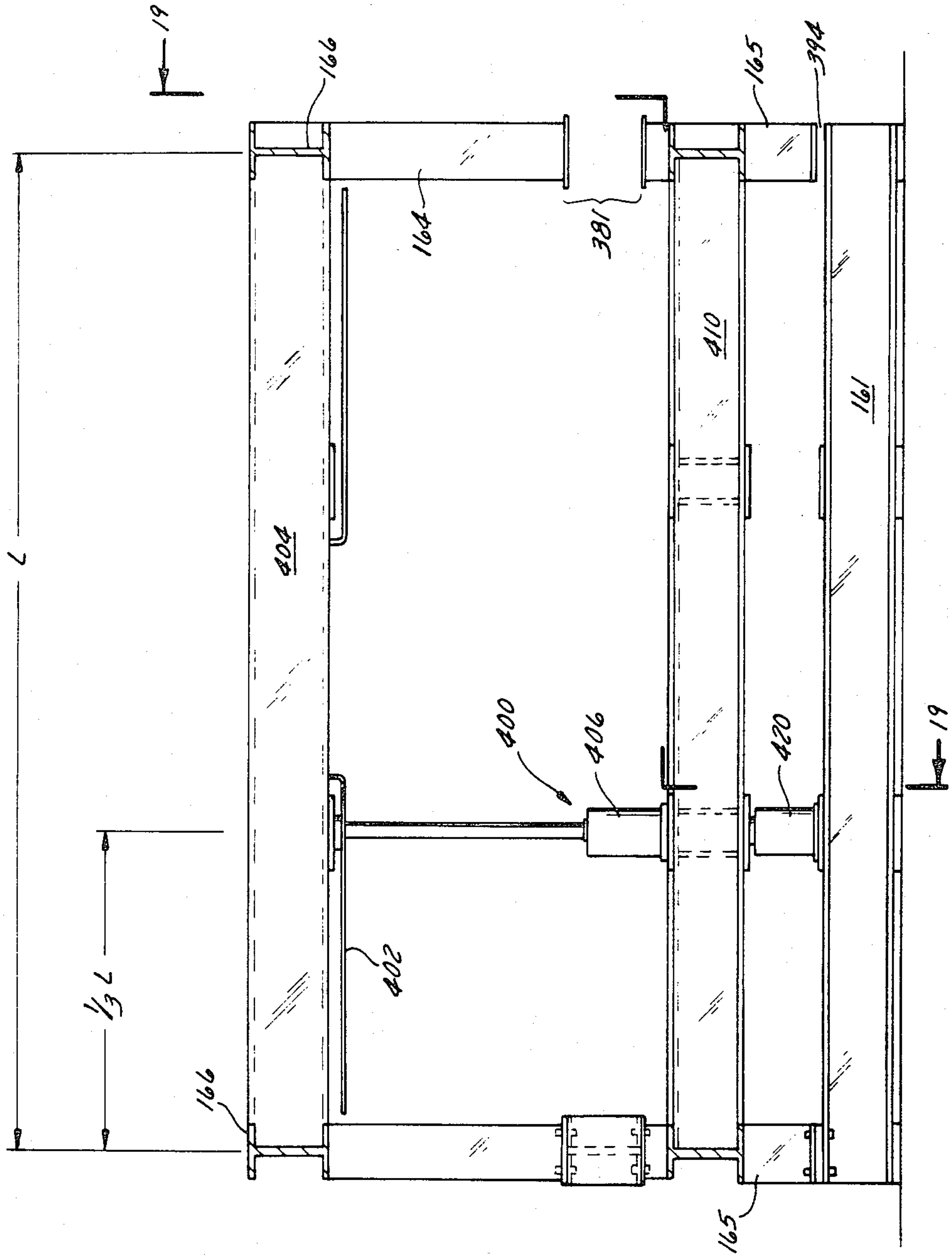
FIG. 18 is a front elevation, partly in section, showing the removable frame sections and internal jacks for belt replacement.

As shown in FIG. 1 and, in detail, in FIGS. 17–19, a frame gap and jack structure is provided to facilitate replacement of the belt. The frame gap and jack structure includes a number of removable sections in the frame and drain line, and a set of jacks to hold the frame open while the belt is removed or replaced through the gaps in the frame provided by the removable sections. The removable frame sections are shown exploded out of the frame in FIG. 1 and the frame is shown in FIG. 17 with the sections removed, the jacks in place, and the adjustments set for belt removal.

There is a removable frame section or spacer 380 in a gap 381 in the vertical frame beam 164. The spacer is in the form of a short length of I-beam having top and bottom plates 382 welded to its top and bottom ends, and having handles 384 welded to its sides for ease of handling. The spacer 380 is bolted in place by a series of bolts 386 (only one of which is shown in FIG. 2), which pass through aligned holes in the plates 382 and corresponding plates 388 welded to the beam 164 at the top and bottom faces of the gap 381.

A second spacer 390 fits into a second gap 391 in the rear vertical beam 163. The spacer 390 is a flat plate having holes drilled therethrough for receiving bolts which pass through aligned holes in plates 392 welded to the beam 163 at the top and bottom faces of the gap 391. A gap 394 similar to the gap 391 is provided between the legs 165 and the base beams 161, and a spacer 396 fits into each gap 394. Likewise, a similar gap 398 is provided between the three stump legs 173 on the overlying beam 171 and the vertically aligned legs 175 for the upper deck 12, and a spacer 399 is provided for each of the three gaps 398.

A system of jacks is provided to hold the gaps in the frame open while the belts 30 and 32 are removed and replaced. The jacks exert a vertical force on the frame members at about one-third of the frame width from the closed side. They bear on transversely extending frame members to provide support for the overhung or cantilevered two-thirds width of the frame when the removable sections are removed.

As shown in FIG. 17–19, a middle front jack 400 to hold open the gap 381 is held by a pair of guide rods 402 fixed to a front top cross beam 404 welded between the near and far side main top beams 166. The jack 400 has a hydraulic cylinder base 406 that rests on a step 408 welded to a front center cross beam 410. The step 408 is aligned vertically below the cross beam 404 and serves to stiffen the cross beam 410 as well as support the jack 400. A middle rear jack 412, identical to the jack 400, is provided to hold open the gap 391. The jack 412 is disposed at the rear end between a rear top cross beam 414 and a rear center cross beam 416, both welded between the near and far side main top beams 166 and the near and far side bottom beams 167, respectively.

A lower front jack 420 is provided to hold open the front gap 394. The jack 420 is disposed between the front center cross beam 410 and the front cross beam 161. A lower rear jack 422, identical to the lower front jack 420 is provided to hold open the rear gap 394. The lower rear jack 402 is disposed between the rear center cross beam 416 and the rear cross base beam 161. A set of similar jacks (now shown) is provided to hold open the gap 398.

In operation, when it is desired to replace the belts 30 and 32, the machine is adjusted to the configuration shown in FIG. 17. Specifically, the belt tensioning mechanism 45 is adjusted to its fully retracted position, and the secondary belt take-up mechanism 350 is adjusted to its fully retracted (lowest) position. The gap adjusting mechanisms 200 are rotated to give the greatest gap dimension and the tie rod 168 is removed. The bolts holding the removable frame sections on the side from which the belt is to be removed are unscrewed and removed, and the bolts on the removable frame sections on the other side of the press are loosened, but not removed. With the belt loose, it is possible to fold the belt at the far side of the machine over itself toward the near side to provide a space for the jacks to be slid into position.

The jacks 400, 412, 420 and 422, and also the jacks for the top gaps 398 are all raised to open the gaps 381, 391, 394 and 398. The spacer 380 and the six spacers 390 are removed and the belts 30 and 32 are slid out of the near side of the machine.

The new belt is installed through the gaps in the frame and the spacers 380 and 390 are reinserted. The jacks are lowered and slid back to the storage position adjacent the far side of the machine and the spacers are secured in position. The belt is arranged smoothly over the rolls, and the belt take-up mechanism 350 is extended to the correct elevation. The tie rod 168 is reinstalled and the cylinders 46 and 48 of the belt tensioning system 45 are repressurized. The gap adjustment mechanisms 200 are returned to their previous settings to reset the gap in the wedge section 62 at the desired setting.

Figure 21:
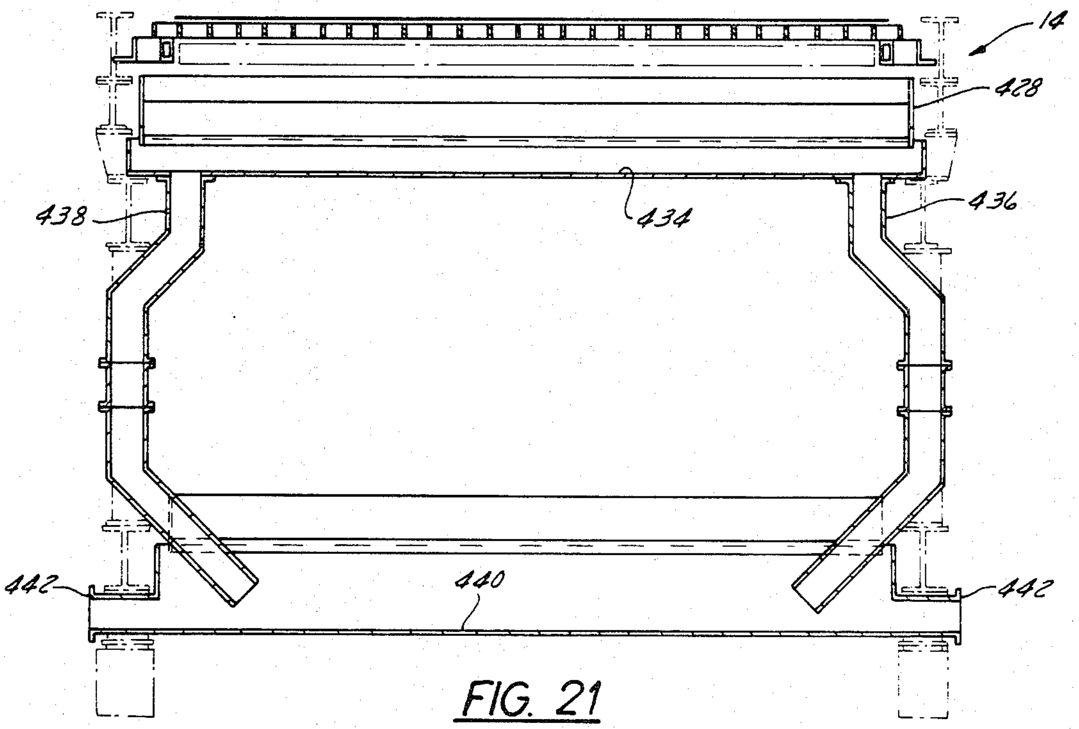
FIGS. 20 and 21 are sectional side and front elevations, respectively, of the drain system of the belt press shown in FIG. 1.
Figure 20:
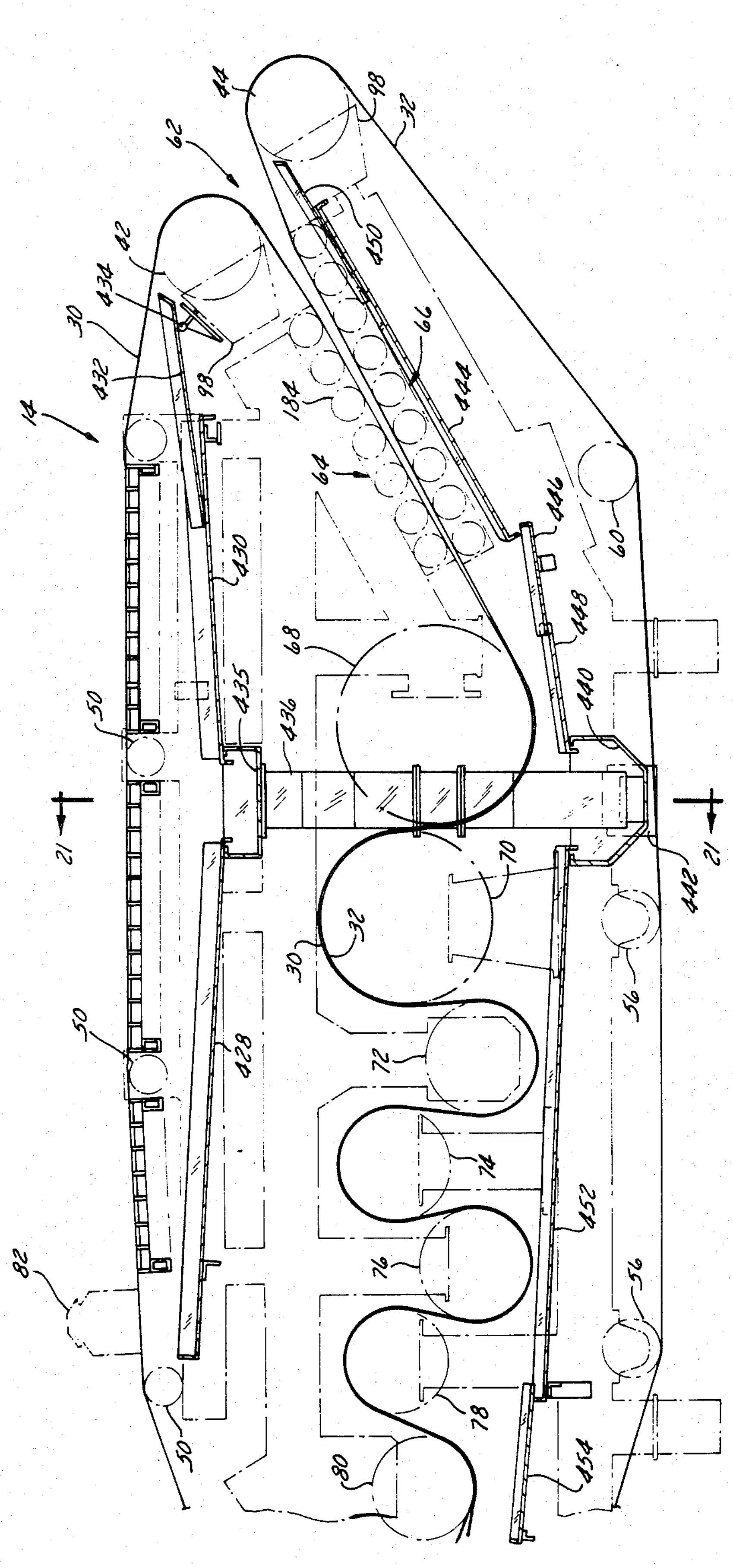

The drain system shown in FIGS. 20 and 21 includes a series of inclined drain pans disposed beneath the belts for catching the liquid that drains through the belts, troughs for collecting the liquid caught by the drain pans, and conduits for conveying away the liquid collected by the troughs.

Looking first at FIG. 2, the upper deck 12 includes a drain pan 424 which catches the water draining through the top run of the belt 16. The water runs down the included surfaces of the pan 424 toward a trough (not shown) at its low point which is directly over a conduit 426. The water pours down the conduit 426 onto a middle set of inclined drain pans, shown in FIG. 20, lying beneath the top run of the upper belt 30 on the lower deck 14. The middle set of drain pans includes a long drain pan 428 under the rear portion of the top run of the belt 30, and a pair of front drain pans 430 and 432. The pan 432 is supported at its front end on each side by pivots 434 connected to the brackets 98, and is supported at its rear end by the pan 430. When the upper belt tensioning system 45 extends forward or retracts rearward, it carries the drain pan 32 with it so that the forward end of the top run of the belt 30 is always underlain by a drain pan.

The drain pans 428 and 430 empty into a trough 435, to the two ends of which are connected to two vertical conduits 436 and 438. The water runs down the conduits 436, 438 and into a lower trough 440 which has a drain connector 442 connected to each end. An external drain line will be connected to one of the connectors 442 and the other one will normally be closed, although external drain lines could be connected to both if necessary.

The water from the wedge section 62 runs off the rolls of the lower rack 66 onto a drain pan 444 and drains down onto a pair of lower front drain pans 446 and 448, which empty into the trough 440. A front drain pan 450 is connected to the bracket 98 of the lower half of the wedge section 62. When the roll 44 is extended or retracted, the drain pan 450 moves with it, sliding over the drain pan 444, so that the pan 450 always underlies the forward portion of the belt 32 as it comes over the roll 44. In this way, the water that runs out of the slurry when it drops over the roll 42 into the entry end of the wedge section 62 will be caught by the pan 450 regardless of the position of the roll 44.

The water expressed from the slurry through the top belt 30 in the wedge section 62 runs along the rolls 184 to the edge of the belt 30, and then runs over the edge onto the pans 444, 450. One of the advantages of skewing the rolls 184 is to faciliate the drainage of the water from the top of the top belt 30 along the rolls 184 off to the side.

Two lower rear drain pans 452, 454 underlie the rolls 70–80. The water expressed from the slurry through the belts 30, 32 drops down onto the pans 452, 454 and runs down their inclined surfaces into the trough 442.

The belt press disclosed herein is a compact, efficient, durable machine that effectively dewaters slurry. Its adjustable wedge section 62 enables the rolls 184 to be positioned, relative to the rolls on the other rack, at the optimum gap, wedge taper, axial offset or skew angle that is most effective for the particular slurry being dewatered. The belt press is designed to obtain maximum useful life from the belts by providing belt shock absorption, extended belt take-up, rubber covered rolls, a belt steering mechanism that produces minute, precise steering roll movements, and movements perpendicular to the bisector of the angle formed by the belt around the steering roll, so that belt stretching by the steering roll is minimized, and lift rolls between the grids 26 and 51. A simple and extremely effective self-cleaning cable equalizer 110 maintains exactly equal displacements of both cylinders on the belt take-up and tensioning mechanism 45 so that the belt is not stretched on either side and tracks straight over the front end rolls 42, 44. The belts are quickly replaceable by use of the removable frame sections and internal jacks, so machine downtime for that purpose is minimized. Compactness is achieved by internally routed drain conduits, internally mounted gear reduction units, hydraulic motors, and a dense arrangement of pressure rolls utilizing a high proportion of vertical belt travel, a strong and open support frame that does not interfere with compact placement of the functional components, and a particularly efficacious method of water extraction that does not require long process times to produce a dry cake.

Obviously, numerous modifications and variations of the discloased embodiment will occur to those skilled in the art in view of this disclosure and the prior art. Accordingly, it is expressly to be understood that these modifications and variations, and the equivalents thereof, may be practiced while remaining within the spirit and scope of the invention as set forth in the following claims.

What is claimed is:

1. In a belt press which includes a frame, a plurality of rolls, and a continuous belt which passes over said rolls, the improvement comprising a belt tensioning system, comprising:

first and second fluid actuators, one of said actuators located on each side of said belt;

first and second pistons extending from each of said actuators;

means mounting said actuators and pistons on longitudinal members of said frame such that the motion of the pistons is constrained to be parallel to the direction of travel of said belt;

a belt tensioning roll mounted on said pistons in contact with said belt, the axis of said belt tensioning roll being perpendicular to the direction of travel of said belt;

a plurality of pulleys rotatably fixed on said frame; and a pair of cables, each of said cables being attached to both said first and second pistons and cooperating with said pulleys so as to provide means for compensating for the differences in force exerted by said pistons such that the pistons move together, thereby maintaining the angle between said belt tensioning roll and said belt as said pistons move in their respective cylinders.

2. A belt press as recited in claim 1, wherein the first of said cables is fixed at one end to one of said pistons near the belt tensioning roll and is trained around at least two of said pulleys, the other end of said first cable being fixed to the second of said pistons near its fluid actuator; and wherein the second of said cables is fixed at one end to said one of said pistons near its fluid actuator and is trained around at least two of said pulleys, the other end of said second cable being fixed to the other of said pistons near said roll.

3. A belt press as recited in claim 2, including means for adjusting the length of each of said cables so as to preset the angle between said roll and said belt.

4. A belt press as recited in claim 2, wherein said cables cross said belt at a point intermediate with said cable ends, and a cross beam is fastened to said longitudinal frame members in the vacinity of said cables.

5. A belt press as recited in claim 3, wherein said cables are pretensioned, so as to carry a force which is equal to the difference in the forces exerted by the two pistons without stretching said cables.

6. A method for maintaining the tension in a belt of a belt press by means of a belt tensioning roll, supported by two pistons controlled by two fluid actuators which are mounted on two laterally spaced frame members of the belt press, comprising the steps of:

a. mounting two pulleys on each of the two frame members of said belt press;

b. connecting said pistons to each other by means of two cables trained around said pulleys such that the pistons are constrained by said cables to move together;

c. adjusting the length of the cables until the belt tensioning roll is at right angles to the direction of travel of the belt; such that the cables maintain said right angle as the pistons move relative to their respective fluid actuators in response to the changes in tension of said belt.

7. A method for maintaining the tension in a belt of a belt press as recited in claim 6, further comprising the step of pretensioning said cables to a tension which is greater than the difference in force between the two pistons, said cable pretension being less than the total force exerted by either of said pistons.

* * * * *